United States Patent [19]

McCabe et al.

[11] Patent Number: 6,024,170
[45] Date of Patent: Feb. 15, 2000

[54] METHODS OF TREATING SUBTERRANEAN FORMATION USING BORATE CROSS-LINKING COMPOSITIONS

[75] Inventors: Michael A. McCabe; Phillip C. Harris, both of Duncan; Billy Slabaugh, Marlow; Ronald J. Powell; John M. Terracina, both of Duncan; Joseph G. Yaritz, Marlow, all of Okla.; Chris E. Shuchart, Plano, Tex.

[73] Assignee: Halliburton Energy Services, Inc., Duncan, Okla.

[21] Appl. No.: 09/089,531

[22] Filed: Jun. 3, 1998

[51] Int. Cl.[7] ............................. E21B 43/22; E21B 43/26
[52] U.S. Cl. ..................... 166/300; 166/308; 507/203; 507/211; 507/217; 507/240; 507/901; 507/902; 507/903
[58] Field of Search ..................................... 166/294, 300, 166/308; 106/900; 405/264; 507/203, 211, 217, 240, 259, 901, 902, 903, 922

[56] References Cited

U.S. PATENT DOCUMENTS

| | | |
|---|---|---|
| 3,058,909 | 10/1962 | Kern . |
| 3,615,794 | 10/1971 | Nimerick . |
| 3,743,613 | 7/1973 | Coulter, Jr. et al. . |
| 3,974,077 | 8/1976 | Free . |
| 4,332,609 | 6/1982 | Ott ............................................. 71/27 |
| 4,560,486 | 12/1985 | Hinkel . |
| 4,619,776 | 10/1986 | Mondshine . |
| 4,627,495 | 12/1986 | Harris et al. ............................. 166/280 |
| 4,664,820 | 5/1987 | Magauran et al. ................... 507/901 X |
| 4,801,389 | 1/1989 | Brannon et al. ...................... 166/308 X |
| 4,843,048 | 6/1989 | House et al. ......................... 507/901 X |
| 5,082,579 | 1/1992 | Dawson .............................. 166/300 X |
| 5,103,913 | 4/1992 | Nimerick et al. ........................ 166/308 |
| 5,160,445 | 11/1992 | Sharif . |
| 5,372,732 | 12/1994 | Harris et al. ............................ 507/217 |
| 5,460,226 | 10/1995 | Lawson et al. .......................... 166/300 |
| 5,486,312 | 1/1996 | Sandiford et al. .................. 507/903 X |
| 5,565,513 | 10/1996 | Kinsey, III et al. ................. 166/308 X |
| 5,681,796 | 10/1997 | Nimerick ............................. 166/308 X |

OTHER PUBLICATIONS

International Publication under the PCT published under No. WO 89/12157 on Dec. 14, 1989.

SPE Paper No. 24339 entitled "Chemistry and Rheology of Borate Crosslinked Fluids at Temperatures Up to 300°F" by Phillip C. Harris, Halliburton Services, presented at the SPE Rocky Mountain Regional/Low Permeability Reservoirs Symposium held in Casper, Wyoming, May 18–21, 1992.

Primary Examiner—George Suchfield
Attorney, Agent, or Firm—Robert A. Kent; C. Clark Dougherty, Jr.

[57] ABSTRACT

The present invention provides improved methods of treating subterranean formations using borate cross-linking compositions and borate cross-linked well treating fluids. The borate cross-linking compositions are basically comprised of a low viscosity hydrocarbon liquid, an organophillic clay, a slightly water soluble borate, a buffer and a dispersing agent.

23 Claims, No Drawings

METHODS OF TREATING SUBTERRANEAN FORMATION USING BORATE CROSS-LINKING COMPOSITIONS

BACKGROUND OF THE INVENTION

1. Field of the Invention

The present invention relates to methods for treating subterranean wells using improved borate cross-linking compositions and cross-linked aqueous well treating fluids.

2. Description of the Prior Art

High viscosity aqueous cross-linked gels are used in a variety of operations and treatments carried out in oil and gas wells. Such operations and treatments include, but are not limited to, well completion operations, fluid loss control treatments, production stimulation treatments, formation permeability conformance operations and treatments to reduce water production.

An example of a production stimulation treatment utilizing a high viscosity cross-linked gelled fluid is hydraulic fracturing. In hydraulic fracturing treatments, the high viscosity fluid is utilized as a fracturing fluid and also carries particulate propping agents, e.g., sand, into the fractures formed. That is, the fracturing fluid is pumped through the well bore into a formation to be stimulated at a rate and pressure such that fractures are formed and extended in the formation. Propping agent is suspended in the fracturing fluid so that it is deposited in the fractures when the gel is broken and returned to the surface. The propping agent functions to prevent the formed fractures from closing whereby conductive channels are formed through which produced fluids can flow to the well bore.

Borate ion has long been used as a cross-linking agent for forming high viscosity cross-linked gelled aqueous well treating fluids. Various sources of borate have been utilized including boric acid, borax, sodium tetraborate, slightly water soluble borates such as ulexite, and other proprietary compositions comprised of boric acid and dimers and trimers of borate ions. These solid materials which form or contain borate ion have varying solubilities in water and can cause operational problems when used as cross-linking agents in the preparation of high viscosity cross-linked gelled aqueous well treating fluids. For example, when the weather conditions are damp or wet, the solids tend to clump whereby they are difficult to meter into a gelled solution. While the solid materials are soluble in water, it is generally difficult to prepare a high concentration solution of the materials. When high concentration solutions are prepared and used, large volumes are generally required. Also, in cold weather, the high concentration solutions crystalize making pumping and metering difficult.

Another problem involved in the preparation of a high viscosity borate ion cross-linked gelled aqueous treating fluid has been the necessity of maintaining the pH of the fluid at a high level by the addition of a caustic solution thereto. That is, the pH of the fluid controls the equilibrium between boric acid and borate ion, the borate ion being the boron species which causes gelled aqueous fluids to cross-link. When the temperature of the fluid increases, the pH of the fluid decreases. Thus, the heretofore used borate cross-linked well treating fluids have been difficult to prepare as a result of temperature and/or pH changes. By elevating the pH of the gelled fluid, the borate ion concentration in the fluid is higher. At relatively high temperatures, the pH of the treating fluid must be very high in order to allow the treating fluid to be cross-linked using a moderate amount of the borate ion source. However, when the water utilized for forming the gelled fluid contains salts such as calcium and magnesium salts which are present in brines and sea water, calcium and magnesium salts are precipitated as the pH of the fluid is raised to the high level required to minimize the quantity of borate source necessary for cross-linking. The precipitation of the salts causes even greater amounts of caustic solution to be required. The use of caustic solution to raise the pH of a borate ion cross-linked well treating fluid and the necessity of including excess borate ion in the fluid to insure stability increases the cost of the fluid and the well treatment performed using the fluid. Thus, there is a need for improved liquid borate cross-linking compositions which can be utilized to form stable borate cross-linked gelled aqueous well treating fluids and methods of using such fluids.

SUMMARY OF THE INVENTION

The present invention provides methods of treating subterranean formations using improved liquid borate cross-linking compositions which include pH control components and delayed borate cross-linking components. The liquid borate compositions are utilized by themselves to form improved stable buffered and cross-linked gelled aqueous well treating fluids.

The improved liquid borate cross-linking compositions of this invention are basically comprised of a low viscosity hydrocarbon liquid, an organophillic clay, a slightly water soluble borate, a buffer and a dispersing agent. A particularly preferred such liquid borate cross-linking composition is comprised of diesel oil, a quaternary ammonium montmorillonite organophillic clay, ulexite, sodium carbonate and a dispersing agent comprised of an alkyl aromatic sulfonic acid or salt thereof.

The improved stable buffered and cross-linked gelled aqueous treating fluids of the invention are basically comprised of water, a hydrated galactomannan gelling agent and a borate cross-linking composition of this invention for buffering the treating fluid and cross-linking the hydrated galactomannan gelling agent therein. The galactomannan gelling agent is generally present in the aqueous treating fluid in an amount in the range of from about 0.1% to about 1.0% by weight of water therein. The borate cross-linking composition is generally present in the treating fluid in an amount in the range of from about 0.07% to about 1.4% by weight of water therein.

The methods of using the improved stable borate cross-linked aqueous gelled treating fluids of this invention are basically comprised of the steps of preparing such a treating fluid and then pumping the treating fluid into a subterranean zone or formation penetrated by a well bore. The fluids are more compatible with resin coated proppants by virtue of the pH control and have been found to exhibit higher consolidation strengths when resin coated proppants are utilized than are achieved when higher pH fluids are used. The fluids also are more compatible with enzyme breakers for the gelling agent which demonstrate improved performance at lower pH.

It is, therefore, a general object of the present invention to provide methods of treating subterranean formations, improved liquid borate cross-linking compositions and improved stable cross-linked gelled aqueous well treating fluids.

Other and further objects, features and advantages of the present invention will be readily apparent to those skilled in the art upon a reading of the description of preferred embodiments which follows.

DESCRIPTION OF PREFERRED EMBODIMENTS

The improved liquid borate cross-linking compositions of this invention which include a pH control additive, i.e., a buffer, and a delayed borate cross-linker, are simple and inexpensive to use in that they can be mixed and pumped at low as well as high temperatures. Further, the borate cross-linking compositions can be used to buffer and cross-link aqueous well treating fluids containing hydrated galactomannan gelling agents without separately adding caustic or buffer. The use of an improved liquid cross-linking composition of this invention enables an aqueous galactomannan gelled well treating fluid to be prepared and then buffered and cross-linked by the addition of a single liquid which produces the proper pH and borate ion concentration in the treating fluid. As a result, the improved cross-linked gelled aqueous treating fluid produced is made up of fewer separate chemicals, is stable and has a predictable pumping time before cross-linking takes place. Further, the treating fluid can be readily prepared using batch mixing procedures or on-the-fly procedures.

The improved liquid borate cross-linking compositions of this invention are basically comprised of a low viscosity hydrocarbon liquid, an organophillic clay, a slightly water soluble borate, a buffer and a dispersing agent. The low viscosity hydrocarbon liquid functions as a carrier for the other components of the composition and can be, for example, a non-volitile hydrocarbon liquid such as hexane, heptane or octane, an aromatic compound such as benzene, toluene or xylene, mixtures of hydrocarbon compounds such as diesel oil, kerosene, mineral oil and lubricating oil, and vegetable oils such as canola, grape seed oil and the like. Of these, diesel oil is preferred. The low viscosity hydrocarbon liquid is generally included in the cross-linking compositions in an amount in the range of from about 40% to about 55% by weight of the compositions, preferably from about 45% to about 50% and most preferably about 47%.

The organophillic clay in the borate cross-linking composition functions as a suspending agent in the low viscosity hydrocarbon liquid. Examples of suitable organophillic clays are quaternary ammonium derivatized clays including, but not limited to, bentonitic clays which are treated with a quaternized amine by well known dry blending or wet slurry manufacturing processes. At least one of the radicals attached to the quaternary amine comprises a member selected from the group of tallow, coco lauryl, stearyl and benzyl and the remaining radicals may be selected from the foregoing group and hydrogen, methyl and ethyl. Of these, dimethyl ditallow quaternary amine is preferred. The organophillic clay is generally included in the cross-linking compositions in an amount in the range of from about 0.5% to about 4% by weight of the compositions, preferably in an amount of from about 1.5% to about 2%.

The slightly water soluble borate included in the cross-linking compositions functions as a time delayed cross-linking agent in a galactomannan gelled aqueous well treating fluid. The slightly water soluble borates which are suitable include, but are not limited to, alkaline earth metal borates, alkali metal-alkaline earth borates and mixtures thereof. Examples of such borates are probertite ($NaCaB_5O_9.5H_2O$), ulexite ($NaCaB_5O_9.8H_2O$), nobleite ($CaB_6O_{10}.4H_2O$), frolovite ($Ca_2B_4O_8. 7H_2O$), colemanite ($Ca_2B_6O_{11}.5H_2O$), calcined colemanite ($Ca_2B_6O_{11}.H_2O$), priceite ($Ca_4B_{10}O_{19}.7H_2O$), paleronite ($MgB_8O_{13}.4H_2O$), hydroboracite ($CaMgB_6O_{11}.6H_2O$), kaliborite ($Kmg_2B_{11}O_{19}.9H_2O$) and other similar borates. Of the various slightly water soluble borates which can be used, colemanite, calcined colemanite, and ulexite are preferred with ulexite being the most preferred. The slightly water soluble borate used is generally included in the cross-linking compositions of this invention in an amount in the range of from about 25% to about 50% by weight of the compositions, preferably in an amount of from about 35% to about 45%, and most preferably in an amount of 40%.

A variety of buffers, i.e., pH control additives, can be utilized in accordance with this invention. Examples of such buffers include, but are not limited to, sodium carbonate, potassium carbonate, lithium carbonate, sodium, potassium and lithium bicarbonates and magnesium oxide. Of these, sodium carbonate is preferred. The buffer is generally included in the compositions of this invention in an amount in the range of from about 2% to about 20% by weight of the compositions, preferably in an amount of from about 8% to about 12% and most preferably in an amount of about 10%.

While various dispersing agents can be used in the cross-linking compositions, a preferred dispersing agent is comprised of an alkyl aromatic sulfonic acid within the scope of the formulas

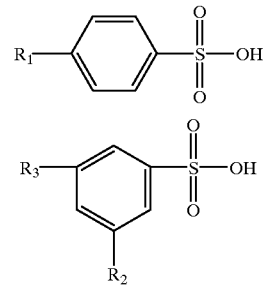

or the alkaline earth metal salts thereof wherein $R_1$ is selected from linear alkyl groups having 8 to 24 carbon atoms and $R_2$ and $R_3$ are linear alkyl groups having from 8 to 24 carbon atoms, preferably from 12 to 14 carbon atoms.

Dispersing agents of the type described above which are preferred for use in accordance with this invention are those selected from the group of the alkaline earth metal salts of dodecylbenzene sulfonic acid with calcium dodecylbenzene sulfonate being the most preferred. The dispersing agent is generally included in the borate cross-linking compositions of this invention in an amount in the range of from about 0.2% to about 5% by weight of the compositions, preferably in an amount of from about 0.5% to about 1.5% and most preferably in an amount of about 1%.

A borate cross-linking composition of this invention is added to a galactomannan gelled aqueous well treating fluid as a single liquid component. The composition controls the pH of the treating fluid at a level whereby the delayed borate therein effectively cross-links the hydrated galactomannan gelling agent in a time period of from about 1 to about 10 minutes as determined by the vortex closure time. The vortex closure time is determined by adding 250 ml of a specified gelled fluid to a 500 ml blender jar or a Waring blender at room temperature. The speed of the blender is adjusted so that the base of the vortex created in the fluid within the jar is at the top of the retaining nut for the blade assembly, while air entrainment is minimized. The desired quantity of cross-linking composition is then added to the jar and the time for vortex closure is measured from the time of cross-linker addition.

When a shorter cross-linking time is required, a second cross-linker comprised of disodium octaborate tetrahydrate can be incorporated in the borate cross-linking composition in an amount in the range of from about 0.4% to about 2.5% by weight of the composition. The addition of the disodium octaborate tetrahydrate cross-linking agent reduces the cross-linking time to in the range of from about 5 seconds to about 3 minutes.

The vortex closure time for a 25 lb/1,000 gal gel is illustrated in the following table.

| Sample No. | Delayed Cross-Linker Concentration, gal/1000 gal | Secondary Cross-Linker Concentration, gal/1000 gal | Vortex Closure Time, min:sec |
|---|---|---|---|
| 1 | 2 | 0 | 5:49 |
| 2 | 2 | 0.1 | 3:09 |
| 3 | 2 | 0.2 | 0:54 |
| 4 | 2 | 0.4 | 0:14 |

The improved stable borate cross-linked gelled aqueous well treating fluids of this invention are basically comprised of water, a hydrated galactomannan gelling agent and a borate cross-linking composition of this invention for buffering the treating fluids and cross-linking the hydrated galactomannan gelling agents therein.

The water utilized to form the improved cross-linked well treating fluids can be fresh water, salt water, brine or any other aqueous liquid which does not adversely react with other components of the treating fluids. The water normally contains one or more salts for inhibiting the swelling of clays in the subterranean formations or zones being treated or to add weight to the treating fluid. The most common clay inhibiting salt utilized is potassium chloride, but other salts can also be used. The pH of the water is preferably in the range of from about 6 to about 8.5 to facilitate the hydration of the galactomannan gelling agent utilized.

The galactomannan gelling agents which can be used in accordance with the present invention are the naturally occurring gums and their derivatives such as guar, locust bean, tara, honey locust, tamarind, karaya, tragacanth, carrageenan and the like. These gums are generally characterized as containing a linear back bone consisting of mannose units having various amounts of galactose units attached thereto. The gums can be manufactured to contain one or more functional groups such as cis-hydroxyl, hydroxyl, carboxyl, sulfate, sulfonate, amino or amide. Of the various galactomannan gelling agents which can be utilized, one or more gelling agents selected from the group of guar, hydroxyethylguar, hydroxypropylguar, carboxymethylguar, carboxymethylhydroxyethylguar and carboxymethylhydroxypropylguar are preferred. Of these, guar is the most preferred. When one or more of the above mentioned galactomannan gelling agents are dissolved in the water used, the gelling agents are hydrated and a viscous aqueous gel is formed. In accordance with this invention, the galactomannan gelling agent or agents utilized are dissolved in the water in an amount in the range of from 0.1% to about 1% by weight of the water, preferably in an amount of about 0.3%.

A liquid borate cross-linking composition of this invention as described above is combined with the aqueous gelled treating fluid for buffering the treating fluid and cross-linking the hydrated galactomannan gelling agent in the treating fluid. Generally, the buffering and cross-linking borate composition is combined with the treating fluid in an amount in the range of from about 0.07% to about 1.4% by weight of water in the treating fluid, preferably in an amount of about 0.3%.

A particularly preferred borate cross-linking composition of this invention is comprised of diesel oil present in the composition in an amount in the range of from about 40% to about 55% by weight thereof, more preferably in an amount of from about 45% to about 50%, a quaternary ammonium montmorillonite organophillic clay present in the composition in an amount in the range of from about 0.5% to about 4% by weight thereof, more preferably in an amount of from about 1.5% to about 2%, ulexite present in the composition in an amount in the range of from about 25% to about 50% by weight thereof, more preferably in an amount of about 35% to about 45%, sodium carbonate present in the composition in an amount in the range of from about 2% to about 20% by weight thereof, more preferably in an amount of from about 8% to about 12%, and a dispersing agent comprising calcium dodecylbenzene sulfonate present in the composition in an amount in the range of from about 0.2% to about 5% by weight thereof, more preferably in an amount of from about 0.5% to about 1.5%.

The borate cross-linking compositions of this invention are stable and are easily mixed, pumped and metered at normal temperatures. The borate ion concentration in the compositions is high, and the compositions have the ability to buffer the resulting treating fluid to a pH between about 8.0 and 9.3 without the need for the addition of any other chemicals such as caustic solution. Because the pH of the treating fluid is below from about 9.3 to about 9.4, calcium and magnesium salts remain in solution.

A particularly preferred stable highly viscous borate cross-linked gelled aqueous well treating fluid of this invention is comprised of water, hydrated guar present in an amount in the range of from about 0.1% to about 1% by weight of the water, more preferably in an amount of about 0.3%, and a borate cross-linking composition of this invention for buffering the treating fluid and cross-linking the hydrated guar in the treating fluid present in an amount in the range of from about 0.07% to about 1.4% by weight of the water, more preferably in an amount of about 0.15% to about 0.35% and most preferably in an amount of 0.3%.

As will be understood by those skilled in the art a variety of conventional additives can be included in the well treating fluids such as gel stabilizers, gel breakers, clay stabilizers, bactericides, fluid loss additives and the like which do not adversely react with the treating fluids or prevent their use in a desired manner.

The improved methods of the present invention for treating a subterranean zone or formation penetrated by a well bore are basically comprised of the steps of preparing a stable high viscosity borate cross-linked gelled aqueous treating fluid of this invention and then pumping the treating fluid into the subterranean zone or formation.

While the improved treating fluids of this invention can be utilized for performing any of the various well treatments mentioned above, the treating fluids are particularly well suited for performing fracture stimulation treatments. In such treatments, a high viscosity well treating fluid is pumped through the well bore into the subterranean zone or formation to be fractured at a high rate and pressure whereby fractures are formed in the subterranean zone or formation and propping agent, such as sand, suspended in the treating fluid is carried into the fractures and deposited therein. Thereafter, the treating fluid is caused to break, i.e., revert to a thin fluid which can be reverse flowed out of the fractures leaving the proppant therein.

In order to further illustrate the compositions and methods of the present invention, the following example is given.

EXAMPLE

A fracture stimulation treatment was performed using a treating fluid of the present invention comprised of fresh water containing 1% by weight of potassium chloride, guar gelling agent present in the treating fluid in an amount of 25 pounds per 1,000 gallons of water (0.3% by weight of water), and a liquid borate cross-linking composition of this invention for buffering the treating fluid and cross-linking the gelling agent present in an amount of 1.75 gallons per 1,000 gallons of water (0.02% by weight of water). The borate cross-linking composition was comprised of diesel oil in an amount of 47%, quaternary ammonium montmorillonite in an amount of 2%, ulexite in an amount of 40%, sodium carbonate in an amount of 10% and calcium dodecylbenzene sulfonate in an amount of 1%, all by weight of the borate cross-linking composition.

The treated formation had a temperature of 160° F. and was at a depth of from 7350 feet to 7450 feet. The stimulation treatment included perforating the producing interval, acidizing the perforations and then fracturing the formation. 61,000 gallons of the above described treating fluid were pumped during the fracturing treatment and 3230 sacks (100 lbs./sack) of 20/40 ottawa sand (propping agent) were placed in the fractures at a maximum proppant concentration of 8 pounds per gallon.

The following was observed during the treatment:
1. The treating fluid was very simple to prepare as compared to prior art borate cross-linked fluids which required the use of more chemicals such as caustic and buffers.
2. The treating fluid had a higher viscosity than the prior art fluids at the same gelling agent concentration indicating less gelling agent could be used.

Thus, the present invention is well adapted to carry out the objects and attain the benefits and advantages mentioned as well as those which are inherent therein. While numerous changes to the compositions and methods can be made by those skilled in the art, such changes are encompassed within the spirit of this invention as defined by the appended claims.

What is claimed is:

1. A method of treating a subterranean zone penetrated by a well bore comprising the steps of:
   preparing a high viscosity treating fluid comprised of water, a hydrated galactomannan gelling agent and a borate cross-linking composition for buffering said treating fluid and cross-linking said hydrated galactomannan gelling agent, said borate cross-linking composition being comprised of a low viscosity hydrocarbon liquid, an organophillic clay, a slightly water soluble borate, a buffer and a dispersing agent; and
   pumping said treating fluid into said zone.

2. The method of claim 1 wherein said galactomannan gelling agent is selected from the group consisting of guar, hydroxyethylguar, hydroxypropylguar, carboxymethylguar, carboxymethylhydroxyethylguar, carboxymethylhydroxypropylguar and mixtures thereof.

3. The method of claim 1 wherein said galactomannan gelling agent is present in said treating fluid in an amount in the range of from about 0.1% to about 1% by weight of said water therein.

4. The method of claim 1 wherein said borate cross-linking composition is present in said treating fluid in an amount in the range of from about 0.07% to about 1.4% by weight of said water therein.

5. The method of claim 1 wherein said low viscosity hydrocarbon liquid in said borate cross-linking composition is diesel oil present in an amount of about 47% by weight of said borate cross-linking composition.

6. The method of claim 1 wherein said organophillic clay in said borate cross-linking composition is dimethyl ditallow quaternary amine bentonite clay present in an amount in the range of from about 1.5% to about 2% by weight of said borate cross-linking composition.

7. The method of claim 1 wherein said slightly soluble borate in said borate cross-linking composition is ulexite and is present in an amount of about 40% by weight of said borate cross-linking composition.

8. The method of claim 1 wherein said buffer in said borate cross-linking composition is sodium carbonate present in an amount of about 10% by weight of said borate cross-linking composition.

9. The method of claim 1 wherein said dispersing agent in said borate cross-linking composition is comprised of calcium dodecylbenzene sulfonate present in said borate cross-linking composition in an amount of about 1% by weight of said borate cross-linking composition.

10. A liquid borate composition for cross-linking aqueous galactomannan gelled well treating fluids comprising a low viscosity hydrocarbon liquid, an organophillic clay, a slightly water soluble borate, a buffer and a dispersing agent.

11. The composition of claim 10 wherein said low viscosity hydrocarbon liquid is selected from the group of diesel oil, kerosene, mineral oil and lubricating oil and is present in said composition in an amount in the range of from about 40% to about 55% by weight thereof.

12. The composition of claim 10 wherein said organophillic clay is selected from the group of quaternary ammonium derivatized clays and is present in said composition in an amount in the range of from about 0.5% to about 4% by weight thereof.

13. The composition of claim 10 wherein said slightly water soluble borate is selected from the group of colemanite, calcined colemanite and ulexite and is present in said composition in an amount in the range of from about 25% to about 50% by weight thereof.

14. The composition of claim 10 wherein said buffer is selected from the group of potassium carbonate and bicarbonate, lithium carbonate and bicarbonate and sodium carbonate and bicarbonate and is present in said composition in an amount in the range of from about 2% to about 20% by weight thereof.

15. The composition of claim 10 wherein said dispersing agent is comprised of an alkyl aromatic sulfonic acid within the scope of the formulas

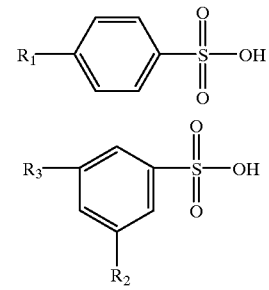

or the alkaline earth metal salts thereof wherein $R_1$ is selected from linear alkyl groups having 8 carbon atoms to 24 carbon atoms and $R_2$ and $R_3$ are linear alkyl groups having from 8 to 24 carbon atoms, and is present in said composition in an amount in the range of from about 0.2% to about 5% by weight thereof.

16. A liquid borate composition for cross-linking aqueous galactomannan gelled well treating fluids comprising:

diesel oil present in said composition in an amount of about 47% by weight thereof;

a quaternary ammonium montmorillonite organophillic clay present in said composition in an amount in the range of from about 1.5% to about 2% by weight thereof;

a slightly water soluble borate comprised of ulexite present in said composition in an amount of about 40% by weight thereof;

a buffer comprised of sodium carbonate present in said composition in an amount of about 10% by weight thereof; and a dispersing agent comprised of calcium dodecylbenzene sulfonate present in said composition in an amount of about 1% by weight thereof.

17. The composition of claim 16 which further comprises sodium octaborate tetrahydrate present in said composition in an amount in the range of from about 0.4% to about 2.5% by weight thereof.

18. A stable, borate cross-linked gelled aqueous well treating fluid comprising:

water;

hydrated guar present in an amount of about 0.3% by weight of said water; and a borate cross-linking composition for buffering said treating fluid and cross-linking said hydrated guar comprised of a low viscosity hydrocarbon liquid, an organophillic clay, a slightly water soluble borate, a buffer and a dispersing agent, said borate composition being present in said treating fluid in an amount of about 0.3% by weight of said water.

19. The treating fluid of claim 18 wherein said low viscosity hydrocarbon liquid in said borate cross-linking composition is diesel oil present in an amount of about 47% by weight of said borate cross-linking composition.

20. The treating fluid of claim 19 wherein said organophillic clay in said borate cross-linking composition is quaternary ammonium montmorillonite present in an amount of about 1.5% by weight of said borate cross-linking composition.

21. The treating fluid of claim 20 wherein said slightly water soluble borate in said borate cross-linking composition is ulexite present in an amount of about 40% by weight of said borate cross-linking composition.

22. The treating fluid of claim 21 wherein said buffer in said borate cross-linking composition is sodium carbonate present in an amount of about 10% by weight of said borate cross-linking composition.

23. The treating fluid of claim 22 wherein said dispersing agent in said borate cross-linking composition is calcium dodecylbenzene sulfonate present in an amount of about 1% by weight of said borate cross-linking compound.

* * * * *